United States Patent [19]

Asada et al.

[11] Patent Number: 4,559,143

[45] Date of Patent: Dec. 17, 1985

[54] SLUDGE TREATING METHOD

[75] Inventors: Hiroshi Asada; Kohei Kobayashi, both of Tochigi; Toshiro Iwama, Tokyo, all of Japan

[73] Assignee: Nichikeri Chemical Industry Co. Ltd., Tokyo, Japan

[21] Appl. No.: 343,374

[22] Filed: Jan. 27, 1982

Related U.S. Application Data

[63] Continuation-in-part of Ser. No. 165,217, Jul. 1, 1980, abandoned.

[30] Foreign Application Priority Data

Jul. 10, 1979 [JP] Japan ................................. 54-87196

[51] Int. Cl.$^4$ ............................................. C02F 11/14
[52] U.S. Cl. .................................... 210/714; 210/727; 210/728; 210/778
[58] Field of Search ............... 210/609, 702, 710, 714, 210/723, 725, 727, 728, 732, 751, 769, 666, 667, 778

[56] References Cited

U.S. PATENT DOCUMENTS

| | | | |
|---|---|---|---|
| 2,130,249 | 9/1938 | Raisch | 210/727 |
| 3,224,965 | 12/1965 | Woolery | 210/666 |
| 3,259,570 | 7/1966 | Priesing et al. | 210/727 |
| 3,531,370 | 9/1970 | Gould | 210/711 |

FOREIGN PATENT DOCUMENTS

| | | | |
|---|---|---|---|
| 1490052 | 7/1969 | France | 210/609 |
| 51-2244 | 1/1976 | Japan | 210/778 |
| 51-2243 | 1/1976 | Japan | 210/728 |
| 1351986 | 5/1974 | United Kingdom | 210/609 |
| 2058035 | 4/1981 | United Kingdom | 210/714 |

*Primary Examiner*—Peter Hruskoci
*Attorney, Agent, or Firm*—Browdy and Neimark

[57] ABSTRACT

The present invention relates to a method for the treatment of sludges such as sewage sludges, night soils, water supply sludges, sludged deposition in bottoms of rivers, lakes, harbors and seas and industrial waste water sludges. According to this method, a fiber in an amount of 0.05 to 20% by weight based on solids in a sludge to be treated and an inorganic coagulant or polymeric coagulant are added to the sludge to coagulate the sludge, and water is removed from the coagulated sludge to obtain a filter cake having a low water content.

7 Claims, No Drawings

SLUDGE TREATING METHOD

CROSS-REFERENCE TO RELATED APPLICATIONS

The present application is a continuation-in-part application of Ser. No. 165,217, filed July 1, 1980, now abandoned, the entire contents of which are hereby incorporated by reference.

BACKGROUND OF THE INVENTION (1) Field of the Invention

The present invention relates to a method for the treatment of sludges such as sewage sludges, night soils, water supply sludges, sludges deposited in bottoms of rivers, lakes, harbors and seas and industrial waste water sludges. More particularly, the present invention relates to a sludge treatment method suitable for coagulation solids and solid-liquid separation in sludges containing organic materials and fine particles of soils.

(2) Description of the Prior Art

As means for disposal of sludges, there is ordinarily adopted a method in which a coagulant is added to a sludge to coagulate solids and solid-liquid separation is carried out or the coagulated solids are mechanically dewatered to form a dewatered sludge having a reduced volume, and the dewatered sludge is discarded as it is or the dewatered sludge is discarded after it has been burnt to ashes or solidified by incorporation of a solidifier.

Sludges rich in organic materials, such as sewage sludges, contain large quantities of hydrophilic colloidal substances and have a high water content, and therefore, it is difficult to dewater these sludges directly as they are. Accordingly, a coagulant is added to such sludge to coagulate solids and the sludge is then mechanically dewatered to form a dewatered sludge (hereinafter referred to as "filter cake"). This filter cake is discarded as it is or after it has been burnt. An inorganic coagulant such as ferric chloride or slaked lime is most popularly used as the coagulant and vacuum filtration is adopted for this mechanical dewatering. However, since the inorganic coagulant is added in a relatively large amount to solids in the sludge, the amount of the filter cake to be disposed of is increased. In the case where the filter cake is burnt, large quantities of ashes are formed and the efficiency of combustion of the filter cake is lowered by incorporation of the coagulant. Moreover, at the dewatering step, ferric chloride or calcium carbonate is deposited on a dewatering filter cloth, resulting in reduction of the filtration efficiency.

Furthermore, there has been adopted a method in which an organic polymeric coagulant (hereinafter referred to as "polymeric coagulant") is used as the coagulant to coagulate the sludge and form a floc and the floc is mechanically dewatered. This method is advantageous over the method using an inorganic filler, because the amount of the filter cake and the amount of ashes left after combustion of the filter cake are reduced. However, the water retention ratio of the floc formed by coagulation is high, and since water is not easily separated from the floc, the floc is readily disintegrated. Therefore, vacuum filtration or pressure filtration cannot be adopted for dewatering of this floc, and hence, dewatering of the floc is performed by centrifugal dewatering. However, the water content of the cake is not significantly reduced by centrifugal dewatering. Furthermore, this method using an organic polymeric coagulant is defective in that the treatment expenses are increased.

SUMMARY OF THE INVENTION

We made researches with a view to improving the filtrability of sludges, especially organic sludges, dewatering of which is very difficult, such as sewage sludges, and we found that when a fiber of polypropylene, Vinylon, polyester or nylon is incorporated into a sludge and a polymeric coagulant is further added thereto, the strength of a floc formed by coagulation is increased and the compressibility of the floc is improved, with the result that the filtrability or dewaterability of the sludge is highly improved. It also was found that good results are similarly obtained when a fiber is dispersed in an aqueous solution of a polymeric coagulant and the dispersion is added to a sludge. Furthermore, it was found that when an inorganic coagulant is added to a sludge and the coagulated sludge is mechanically dewatered, if a fiber is incorporated in combination of the coagulant, the filtrability is remarkably improved and separation of the filter cake from the filter cloth is performed more easily and cleanly than in the conventional method. We have now completed the present invention based on these findings.

It is therefore a primary object of the present invention to provide a method for the treatment of sludges, in which the defects of the conventional methods can be eliminated, the filtrability of sludges can be remarkably improved even with the use of conventional coagulants and the post treatment of filter cakes can be facilitated.

More specifically, in accordance with the present invention, there is provided a method for the treatment of sludges, which comprises incorporating and mixing a fiber and a coagulant into a sludge to coagulate solids in the sludge, and dewatering the coagulated sludge.

In the instant specification and appended claims, by the term "sludge" are meant sewage sludges such as raw sludges, digested sludges and mixtures thereof, which are formed in sewage treatment plants, night soils, sludges formed in water purification and water supply plants, sludges deposited and sedimented in bottoms of rivers, lakes, harbors and seas, and industrial waste water sludges.

DETAILED DESCRIPTION OF THE PREFERRED EMBODIMENTS

In the present invention, a fiber is incorporated into a sludge to be treated, together with a coagulant.

As the fiber that is used in the present invention, there are: man-made organic fibers such as rayon fibers and acetate cellulose fibers, synthetic fibers such as polyester fibers, Vinylon fibers, polyamide, fibers, aromatic polyamide fibers, acrylic fibers, polypropylene fibers, polyvinyl chloride fibers and polyvinylidene fibers. The length of the fiber to be used in the present invention is ordinarily about 1 to about 10 mm and is preferably about 2 to about 7 mm, and the thickness of the fiber to be used in the present invention is ordinarily less than 20 denier and is preferably less than 10 denier.

Either fibers having the surface treated with a surface active agent and/or a dispersant or fibers which have not been subjected to such surface treatment can be used in the present invention. As the dispersant there may be used any conventional ones such as sodium dialkylsuccisulfonate.

The use of an organic fiber of thickness less than 20 denier and length less 10 mm in an amount of 0.05 to 20% by weight based on the solids of a sludge in the present invention gives the following advantages: the fiber particles are uniformly dispersed within the sludge wherein each particle becomes a core to facilitate the formation of a floc by a coagulant; the strength of the formed floc is simultaneously increased and as the result the compressability of the formed floc is remarkably improved; the filtrability of the sludge is remarkably improved and separation of the filter cake from the filter cloth may be carried out more easily, more effectively and more cleanly than in the conventional method; separation of water is accelerated to enable rapid dewatering and the water content in the residual filter cake is remarkably reduced; and handing of the cake is facilitated accordingly.

The combustibility of a filter cake at the combustion step is increased by the presence of an organic fiber and the amount of ashes formed by combustion is reduced, and a good product is obtained when the filter cake is converted to a fertilizer.

The amount used of the fiber is changed according to the kind and properties of the sludge to be treated, the kinds of the fiber and coagulant used and the treatment conditions, but the fiber is ordinarily used in an amount of about 0.05 to about 20% by weight, preferably about 0.1 to about 10% by weight, based on solids contained in the sludge. When the amount of the fiber is smaller than 0.05% by weight based on solids in the sludge, no substantial effect can be attained by incorporation of the fiber. When the amount of the fiber is larger than 20% by weight based on solids in the sludge, no substantial increase of the effect of improving the filtrability can be attained by increase of the amount used of the fiber, but the viscosity of the sludge is increased and entanglements are caused in the fiber, rendering the subsequent operations difficult and troublesome. Furthermore, incorporation of too large an amount of the fiber is not preferred from the economical viewpoint. When the sludge is treated in a large amount by mechanical means, if the fiber is incorporated in a large amount, the mechanical dewatering operation becomes difficult and troublesome. Therefore, it is especially preferred that the fiber be incorporated in an amount of up to 20% by weight based on solids in the sludge.

Various methods may be adopted for adding the fiber to a sludge. For example, there may be adopted a method in which the fiber is directly added to a sludge and is mixed with the sludge, a method in which the fiber is incorporated and dispersed in an aqueous solution of a polymeric coagulant and the dispersion is incorporated and mixed into a sludge, and a method in which the fiber is incorporated and dispersed in water (a surface active agent or dispersant is added according to need) and the dispersion is incorporated in a sludge.

In each method, it is preferred that the fiber be dispersed into a sludge as homogeneously as possible. The time of addition of the fiber to a sludge is not particularly critical, but ordinarily, the fiber is added to a sludge prior to incorporation of a coagulant or the fiber is added to the sludge together with the coagulant. When the fiber is added to the sludge after incorporation of the coagulant into the sludge, a sufficient effect can hardly be exerted by addition of the fiber. However, in the case where two or more coagulants are added to a sludge, when these coagulants are added to the sludge in two times and coagulation first starts with addition of the latter coagulant, the fiber may be added in an intermediate stage after addition of the former coagulant and before addition of the latter coagulant.

Known coagulants can be used in carrying out the present invention. The coagulants are roughly divided into inorganic coagulants and organic coagulants. As the inorganic coagulant, there can be mentioned, for example, aluminum sulfate, basic aluminum chloride, ferrous sulfate, ferric sulfate, chlorinated coppers [$FeCl_3 + Fe_2(SO_4)_3$], ferric chloride, alum, unslaked lime and slaked lime.

Polymeric coagulants include natural and synthetic products, and they are divided into anionic coagulants, cationic coagulants, nonionic surfactants and amphoteric coagulants according to the ionic characteristics. As the anionic polymeric coagulant, there can be mentioned, for example, polyacrylic acid salts, salts of acrylic acid-maleic acid copolymers, acrylamide-sodium acrylate copolymers, acrylamide-sodium vinylsulfonate copolymers, partially hydrolyzed polyacrylamide, a sodium salt of carboxymethyl cellulose and sodium alginate. As the cationic polymeric coagulant, there can be mentioned, for example, polydialkylaminoalkyl methacrylates, polyaminomethylacrylamide, polyvinylpyridium salts, polydiacrylammonium salts, polyvinylimidazoline, polyamines, polyethyleneimines, cationic derivatives and cationic copolymers of polyacrylamide, water-soluble aniline resin hydrochlorides, hexamethylenediamine-epichlorohydrin polycondensates, chitosan and cationic starch. As the nonionic polymeric coagulant, there can be mentioned, for example, polyacrylamide, polyvinyl alcohol, polyethylene oxide, polyvinyl pyrrolidone, water-soluble urea resins, starch, prulan and guar gum. Gelatin can be mentioned as the amphoteric polymeric coagulant.

When organic sludges or sludges containing large quantities of colloidal substances or fine particles are treated, cationic polymeric coagulants often provide better results than other ionic polymeric coagulants.

These coagulants may be used singly or in the form of a mixture of two or more of them.

As the assistant for promoting the coagulating and dewatering effects of the coagulant, there can be used pH adjusting agents, coagulating assistants, surface active agents and water-soluble salts. As the pH adjusting agent, there can be used, for example, sulfuric acid, hydrochloric acid, nitric acid, sulfamic acid, carbon dioxide gas, acetic acid, sodium hydroxide, sodium carbonate, unslaked lime and slaked lime. As the coagulating assistant, there can be mentioned, for example, bentonite, kaolin, acid clay, zeolite, diatomaceous earth, water glass, activated clay and active carbon. Surface active agents include cationic, anionic, nonionic and amphoteric surface active agents, and any of known surface active agents can be used in the present invention but cationic surface active agents are ordinarily preferred. For example, there are preferably employed aliphatic and aromatic monoamines, diamines, triamines and amidoamines having a higher alkyl group, polyaminoethyl imidazolines, higher hydroxyalkyl alkylene diamines, rosin amines, and ethylene oxide adducts thereof and water-soluble acid and quaternary ammonium salts of these amines and ethylene oxide adducts. The combined use of a cationic surface active agent with the coagulant is very effective for the treatment of organic sludges and colloidal substance-containing sludges. Moreover, since the amount of the fiber can be reduced by the combined use of a surface active agent with the coagulant, good results are obtained when a large quantity of a sludge is dewatered. As the water-soluble salt, there can be mentioned, for example, K, Na, Li, Sr, NH4, Ca, Mg, Zn, Fe, Ba and Al salts of hydrochloric acid, nitric acid, sulfuric acid, sulfamic acid and acetic acid.

In the present invention, the coagulant and coagulating assistant may be added according to customary methods, and the amounts used of these agents are equal to or smaller than the amounts customarily adopted in the sludge treatments. For example, when a sewage sludge is treated by ferric chloride and slaked lime, ferric chloride is ordinarily added in an amount of about 3 to about 12% by weight based on solids in the sludge and slaked lime is ordinarily added in an amount of about 10 to about 40% by weight based on solids in the sludge. When a polymeric coagulant is used for the treatment of a sewage sludge, the polymeric coagulant is added in an amount of about 0.01 to about 3% by weight, preferably about 0.05 to about 2% by weight, based on solids in the sludge.

These coagulants may be used singly or in the form of a mixture of two or more of them, and conventional techniques can be adopted for incorporation of these coagulants. It is possible to use polymeric coagulants differing in the ionic characteristics in combination or to use a polymeric coagulant and an inorganic coagulant in combination.

As pointed out hereinbefore, the coagulant is added to a sludge after the fiber has been incorporated and mixed into the sludge, or the coagulant is added to the sludge together with the fiber. When the coagulant is thus added to a sludge, solids in the sludge are immediately coagulated to form a floc while causing solid-liquid separation. Since the fiber promotes dewatering of the floc, a good water-separating effect (dewatering effect) can be attained in this floc even in case of gravity dewatering. Furthermore, if a slight pressure is applied to this filtration residue, water in the floc can easily be removed. Accordingly, when the sludge is coagulated and dewatered by a dewatering machine such as a belt filter, a decantor or a belt press type dewatering machine, dewatering of the interior of the filter cake is promoted by the fiber while the filter cake is reinforced by the fiber, and the compressibility of the filter cake is highly improved. Accordingly, dewatering is accomplished easily, promptly and sufficiently, and a filter cake having a low water content is obtained. Moreover, clogging of the filter cloth is much reduced and discharge of the filter cake from the filter cloth is remarkably facilitated.

The characteristic features and effects of the sludge treatment method according to the present invention will now be described.

(1) In the case where an inorganic coagulant is used as the coagulant for a sludge, if the fiber is used in combination with the inorganic coagulant according to the method of the present invention, the speed of dewatering the sludge is remarkably increased and the filtrability is highly improved. Furthermore, the turbidity of the filtrate is reduced.

(2) In the case where a polymeric coagulant is used as the coagulant for a sludge, even when the treatment is very difficult with a small amount of the polymeric coagulant used singly, the treatment can be accomplished advantageously if the fiber is used in combination of the polymeric coagulant according to the method of the present invention.

(3) In case of single use of a polymeric coagulant, kinds of sludges that can be treated are limited, but if the fiber is used in combination with the polymeric coagulant, this limitation is overcome and a high treating effect can be obtained stably irrespectively of the kinds of sludges.

(4) Even in case of organic sludges, although a significant treating effect is obtained only by the use of a highly cationic polymeric coagulant according to the conventional technique, a high treating effect can be obtained according to the method of the present invention even when a moderately cationic or lowly cationic polymeric coagulant is used.

(5) When the method of the present invention is adopted, the strength of the formed floc is increased and the filtrability is remarkably improved. Since the filtrability is high and the water content of the filter cake is low, the incineration cost is reduced at the step of burning the filter cake. When an organic fiber is used as the fiber, attainment of the effect of promoting the incineration can be expected according to the amount incorporated of the organic fiber.

(6) The method of the present invention provides a satisfactory treating effect even at low temperatures, and the treatment efficiency at low temperatures is highly improved over the low temperature treatment efficiency attainable by conventional methods.

(7) The method of the present invention can be carried out by employing an existing equipment, and the treatment capacity of the equipment is increased by adoption of the method of the present invention.

(8) Either an inorganic coagulant or a polymeric coagulant can be used effectively in the method of the present invention. Furthermore, even if an anionic or nonionic polymeric coagulant is used, satisfactory results can be obtained.

The method of the present invention having the above-mentioned structure has various excellent characteristics and functional effects as described above, and the method of the present invention is very suitable for the treatment of sewage sludges. Furthermore, the method of the present invention is advantageously applied to the treatment of raw sewages, supply water sludges, sludges deposited in bottoms of rivers, lakes, harbors and seas and industrial waste water sludges. The method of the present invention provides very good results when sludges are mechanically dewatered, but also when the method of the present invention is applied to the treatment where mechanical dewatering is not effected, good results are similarly obtained because gravity dewatering is remarkably enhanced.

The present invention will now be described in detail with reference to the following examples that by no means limit the scope of the invention. In these examples, the treatment of sewage sludges which are organic sludges, dewatering of which is most difficult, is illustrated.

EXAMPLE 1

To 100 g of a mixed raw sewage sludge (solid content=3.5% by weight, ignition loss of solids=54% by weight), polypropylene fiber "P-Chop" (length: 5 mm, thickness: 3 denier) (manufactured and sold by Chisso Corporation) was added in an amount shown in Table 1, and the mixture was stirred for about 1 minute. Polypropylene fiber "P-Chop" is one that had been treated with sodium dialkyl-succisulfonate. After the mixing and stirring, an aqueous solution of ferric chloride (30°

Baume) and slaked lime were added to the mixture in amounts shown in Table 1. The filtrability and the transmission of the filtrate were determined according to the Nutsche test to obtain results shown in Table 1.

For comparison, ferric chloride and slaked lime were added to the same sludge as used in Example 1 but the fiber was not added, and the mixture was treated and tested in the same manner as described in Example 1. The obtained results are shown in Table 1.

The test method adopted is described below. Nutsche Test (according to "Sewage Test Methods" published by the Japan Sewage Works Association):

A coagulant is added to 100 g of a sewage sludge (to which a fiber is added or not added) and the mixture is stirred. The mixture is charged in a filtering flask and subjected to vacuum filtration (from atmospheric pressure to 100 mm Hg), and (1) the time (seconds) required for formation of 50 ml of the filtrate and (2) the amount (ml) of the filtrate formed in 30 seconds from the start of filtration are determined. Furthermore, (3) the transmission of the filtrate is measured when the sludge is filtered to such an extent that water disappears from the surface of the sludge. The transmission is expressed as a relative value calculated based on the assumption that the transmission of city water is 100%.

water and the water content of the filter cake after the gravity filtration were measured to obtain results shown in Table 2.

For comparison, only the coagulant was similarly added to the same sludge as used in Example 2 without addition of the fiber. The mixture was treated and tested in the same manner as described in Example 2. The obtained results are shown in Table 2.

The filtration test method adopted is described below.

Gravity Filtration

A predetermined amount of a coagulant is added to a sludge (to which a fiber has been added or not added), and the mixture is stirred for about 1 minute to form a floc. The solid-liquid mixture is poured on a polypropylene filter cloth placed on a beaker having a capacity of 200 ml and is allowed to stand still for 1 minute. The amount (ml) of water flowing out into the beaker in 1 minute is measured, and this amount is designated as the amount of separated water.

Compressive Filtration

Subsequently to the above-mentioned gravity filtration test, an iron column having a diameter of about 7.5

TABLE 1

| | Amounts Added Based on Solids in Sludge | | | | Nutsche Test | | |
|---|---|---|---|---|---|---|---|
| | | | P-Chop | | Time (seconds) | | |
| Run No. | Ferric Chloride Aqueous Solution (30° Baume) (% by weight) | Slaked Lime (% by weight) | Amount Added (% by weight) | Fiber Length (mm) | Required for Formation of 50 ml of Filtrate | Amount (ml) of Filtrate Formed in 30 seconds | Transmission (%) of Filtrate |
| Present Invention | | | | | | | |
| 1 | 20 | 25 | 2.9 | 2.5 | 22.0 | 58.1 | 95.6 |
| 2 | 20 | 25 | 14.3 | 2.5 | 14.0 | 72.0 | 96.7 |
| 3 | 20 | 25 | 28.6 | 2.5 | 12.0 | 72.3 | 96.0 |
| 4 | 20 | 25 | 2.9 | 5.0 | 22.0 | 60.0 | 96.3 |
| 5 | 20 | 25 | 14.3 | 5.0 | 19.0 | 67.8 | 97.8 |
| 6 | 20 | 25 | 28.6 | 5.0 | 20.0 | 71.0 | 94.4 |
| 7 | 10 | 15 | 2.9 | 2.5 | 335 | 18.3 | 92.5 |
| 8 | 10 | 15 | 14.3 | 2.5 | 75 | 29.1 | 94.3 |
| 9 | 10 | 15 | 28.6 | 2.5 | 58 | 28.8 | 93.4 |
| 10 | 10 | 15 | 2.9 | 5.0 | 200 | 15.9 | 91.3 |
| 11 | 10 | 15 | 14.3 | 5.0 | 100 | 21.2 | 88.2 |
| 12 | 10 | 15 | 28.6 | 5.0 | 44 | 36.3 | 89.7 |
| Comparison | | | | | | | |
| 13 | 20 | 25 | — | — | 57.0 | 33.9 | 88.4 |
| 14 | 10 | 15 | — | — | 408 | 11.0 | 70.6 |

EXAMPLE 2

To 100 g of a mixed raw sewage sludge (solid content=3% by weight, ignition loss of solids=54% by weight), polypropylene fiber "P-Chop" (length: 5 mm, thickness: 3 denier) was added in an amount shown in Table 2, and the mixture was stirred for about 1 minute. Then, a 0.2% by weight aqueous solution of a cationic polymeric coagulant (manufactured and sold under the tradename of "Accofloc C485" by Mitsui-Cyanamide Ltd.) was added in an amount shown in Table 2 and the mixture was stirred for about 1 minute. Immediately, a floc was formed. Subsequently, the solid-liquid separation filtration test (gravity filtration and compressive filtration) was carried out, and the amount of separated cm, a height of about 8.6 cm and a weight of 3 Kg is stationarily placed and loaded for 30 seconds on the sludge on the filter cloth. The amount (ml) of water flowing out into the beaker during this period is measured. The sum (ml) of the so measured amount of water and the amount of separated water measured at the gravity filtration test is designated as the amount (ml) of separated water at the compressive filtration test.

Water Content of Filter Cake after Compressive Filtration

After the compressive filtration has been conducted for 30 seconds, the iron column is immediately removed, and the water content (% by weight) of the filter cake is measured.

TABLE 2

| Run No. | Weight (g) of Sludge | P-Chop Fiber Length (mm) | P-Chop Amount Added (g) | Amount Added (g) of 0.2% Solution of Accoflock C485* | Amount (ml) of Separated Water at Gravity Filtration | Amount (ml) of Separated Water at Compressive Filtration | Water Content (% by weight) of Filter Cake after Compressive Filtration |
|---|---|---|---|---|---|---|---|
| | | | | Present Invention | | | |
| 1 | 100 | 2.5 | 0.1 | 7.0 | 61.0 | 80.0 | 88.5 |
| 2 | 100 | 2.5 | 0.5 | 7.0 | 62.0 | 82.0 | 85.7 |
| 3 | 100 | 2.5 | 1.0 | 7.0 | 66.0 | 88.0 | 78.9 |
| 4 | 100 | 5.0 | 0.1 | 7.0 | 61.5 | 83.0 | 87.1 |
| 5 | 100 | 5.0 | 0.5 | 7.0 | 62.5 | 83.5 | 85.1 |
| 6 | 100 | 5.0 | 1.0 | 7.0 | 65.0 | 85.0 | 81.8 |
| | | | | Comparison | | | |
| 7 | 100 | — | — | 7.0 | 60.0 | 74.5 | 90.8 |

*Accoflock C485: cationic polymeric coagulant (copolymer of dimethylamino-ethyl-acrylate and acrylamide)

EXAMPLE 3

TABLE 3

| Run No. | Weight (g) of Sludge | P-Chop Fiber Length (mm) | P-Chop Amount Added (g) | Amount Added (g) of 0.2% Solution of Accofloc C451* | Amount (ml) of Separated Water at Gravity Filtration | Amount (ml) of Separated Water at Compressive Filtration | Water Content (% by weight) of Filter Cake after Compressive Filtration |
|---|---|---|---|---|---|---|---|
| | | | | Present Invention | | | |
| 1 | 100 | 2.5 | 0.5 | 7.0 | 61.0 | 87.5 | 82.1 |
| 2 | 100 | 2.5 | 1.0 | 7.0 | 62.0 | 90.5 | 77.1 |
| 3 | 100 | 5.0 | 0.5 | 7.0 | 61.0 | 88.0 | 81.6 |
| 4 | 100 | 5.0 | 1.0 | 7.0 | 62.5 | 89.0 | 77.8 |
| | | | | Comparison | | | |
| 5 | 100 | — | — | 7.0 | 59.5 | 73.0 | 91.2 |

*Accofloc C451: cationic polymeric coagulant (copolymer of dimethylamino-ethylmethacrylate and acrylamide)

To 100 g of the same mixed raw sewage as used in Example 2, polypropylene fiber "P-Chop" (length 5 mm, thickness: 3 denier) was added in an amount shown in Table 3, and the mixture was stirred for about 1 minute. Then, a 0.2% by weight aqueous solution of a cationic polymeric coagulant (manufactured and sold under the tradename of "Accofloc C451" by Mitsui-Cyanamide Ltd.) was added to the mixture in an amount shown in Table 3. The mixture was stirred for about 1 minute, and a floc was immediately formed. The solid-liquid separation filtration test (gravity filtration and compressive filtration) was carried out in the same manner as described in Example 2, and the amount of separated water and the water content of the filter cake after the compressive filtration were measured to obtain results shown in Table 3.

For comparison, only the coagulant was added to the same sludge as used in Example 3 without addition of P-Chop, and the mixture was treated and tested in the same manner as in Example 3. The obtained results are shown in Table 3.

EXAMPLE 4

In 100 parts by weight of water was dissolved 0.2 parts by weight of Accofloc C485, and polypropylene fiber "P-Chop" (length: 5 mm, thickness: 3 denier) was added to the solution in an amount shown in Table 4 to form an aqueous solution of a fiber-incorporated polymeric coagulant. Then, 7 g of the so formed coagulant solution was added to 100 g of the same mixed raw sewage sludge as used in Example 2, and the mixture was stirred for about 1 minute to form a floc. The solid-liquid separation filtration test (gravity filtration and compressive filtration) was carried out, and the amount of separated water and the water content of the filter cake after the compressive filtration were measured to obtain results shown in Table 4.

For comparison, an aqueous solution of the polymeric coagulant free of the fiber was similarly added to the same sludge as used in Example 4, and the mixture was treated and tested in the same manner as in Example 4. The obtained results are shown in Table 4.

TABLE 4

| Run No. | Composition of Coagulant Solution Water (parts by weight) | Composition of Coagulant Solution Accofloc C485 (parts by weight) | P-Chop Fiber Length (mm) | P-Chop Amount Added (parts by weight) | Amount (g) of Coagulant Solution Added of 100 g of Sludge | Amount (ml) of Separated Water at Gravity Filtration | Amount (ml) of Separated Water at Compressive Filtration | Water Content (% by weight) of Filter Cake after Compressive Filtration |
|---|---|---|---|---|---|---|---|---|
| | | | | | Present Invention | | | |
| 1 | 100 | 0.2 | 2.5 | 1.0 | 7.0 | 66.0 | 84.0 | 86.7 |
| 2 | 100 | 0.2 | 2.5 | 3.0 | 7.0 | 68.0 | 87.0 | 83.9 |
| 3 | 100 | 0.2 | 5.0 | 1.0 | 7.0 | 67.0 | 85.5 | 85.7 |
| 4 | 100 | 0.2 | 5.0 | 3.0 | 7.0 | 69.0 | 86.0 | 84.7 |
| | | | | | Comparison | | | |

TABLE 4-continued

| Run No. | Composition of Coagulant Solution | | | | Amount (g) of Coagulant Solution Added of 100 g of Sludge | Amount (ml) of Separated Water at Gravity Filtration | Amount (ml) of Separated Water at Compressive Filtration | Water Content (% by weight) of Filter Cake after Compressive Filtration |
|---|---|---|---|---|---|---|---|---|
| | Water (parts by weight) | Accofloc C485 (parts by weight) | P-Chop Fiber Length (mm) | P-Chop Amount Added (parts by weight) | | | | |
| 5 | 100 | 0.2 | — | — | 7.0 | 60.0 | 74.5 | 90.8 |

EXAMPLE 5

In 100 parts by weight of water was dissolved 0.2 parts by weight of Accofloc C451, and polypropylene fiber "P-Chop" (length: 5 mm, thickness: 3 denier) was added to the solution in an amount shown in Table 5 to form an aqueous solution of a fiber-incorporated polymeric coagulant. Then, 7 g of the so formed coagulant solution was added to 100 g of the same mixed raw sewage sludge as used in Example 2, and the mixture was stirred for about 1 minute to form a floc. The solid-liquid separation filtration test (gravity filtration and compressive filtration) was carried out, and the amount of separated water and the water content of the filter cake after the compressive filtration were measured to obtain results shown in Table 5.

For comparison, an aqueous solution of the polymeric coagulant free of the fiber was similarly added to the same sludge as used in Example 5, and the mixture was treated and tested in the same manner as in Example 5. The obtained results are shown in Table 5.

EXAMPLE 6

In 100 parts by weight of water was dissolved 0.1 parts by weight of Accofloc C485, and polypropylene fiber "P-Chop" (length: 5 mm, thickness: 3 denier) was was added to the solution in an amount shown in Table 6 to form an aqueous solution of a fiber-incorporated polymeric coagulant. Then, the so formed coagulant solution was added in an amount shown in Table 6 to 100 g of a digested sewage sludge (solid content=3% by weight, ignition loss of solids=60% by weight) and the mixture was stirred for about 1 minute to form a floc. The solid-liquid separation filtration test (gravity filtration and compressive filtration) was carried out, and the amount of separated water and the water content of the filter cake after the compressive filtration were measured to obtain results shown in Table 6.

For comparison, an aqueous solution of Accofloc C485 free of the fiber was similarly added to the same sludge as used in Example 6, and the mixture was treated and tested in the same manner as in Example 6.

TABLE 5

| Run No. | Composition of Coagulant Solution | | | | Amount (g) of Coagulant Solution Added to 100 g of Sludge | Amount (ml) of Separated Water at Gravity Filtration | Amount (ml) of Separated Water at Compressive Filtration | Water Content (% by weight) of Filter Cake after Compressive Filtration |
|---|---|---|---|---|---|---|---|---|
| | Water (parts by weight) | Accofloc C451 (parts by weight) | P-Chop Fiber Length (mm) | P-Chop Amount Added (parts by weight) | | | | |
| *Present Invention* | | | | | | | | |
| 1 | 100 | 0.2 | 2.5 | 0.5 | 7.0 | 66.0 | 79.0 | 89.2 |
| 2 | 100 | 0.2 | 2.5 | 1.0 | 7.0 | 66.5 | 82.0 | 87.7 |
| 3 | 100 | 0.2 | 5.0 | 0.5 | 7.0 | 67.0 | 81.0 | 88.3 |
| 4 | 100 | 0.2 | 5.0 | 1.0 | 7.0 | 70.0 | 84.5 | 86.4 |
| *Comparison* | | | | | | | | |
| 5 | 100 | 0.2 | — | — | 7.0 | 59.5 | 73.0 | 91.2 |

The obtained results are shown in Table 6.

TABLE 6

| Run No. | Composition of Coagulant Solution | | | Amount (g) of Coagulant Solution Added to 100 g of Sludge | Amount (ml) of Separated Water at Gravity Filtration | Amount (ml) of Separated Water at Compressive Filtration | Water Content (% by weight) of Filter Cake after Compressive Filtration |
|---|---|---|---|---|---|---|---|
| | Water (parts by weight) | Accofloc C485 (parts by weight) | P-Chop (fiber length = 5 mm) (parts by weight) | | | | |
| *Present Invention* | | | | | | | |
| 1 | 100 | 0.1 | 0.5 | 10.0 | 72.0 | 86.0 | 87.3 |
| 2 | 100 | 0.1 | 0.5 | 12.0 | 75.0 | 91.5 | 85.1 |
| 3 | 100 | 0.1 | 0.5 | 14.0 | 80.0 | 95.0 | 83.8 |
| 4 | 100 | 0.1 | 1.0 | 10.0 | 74.5 | 89.0 | 85.5 |
| 5 | 100 | 0.1 | 1.0 | 12.0 | 75.0 | 91.0 | 85.4 |
| 6 | 100 | 0.1 | 1.0 | 14.0 | 79.0 | 96.5 | 82.5 |
| *Comparison* | | | | | | | |
| 7 | 100 | 0.1 | — | 10.0 | 57.5 | 69.5 | 92.6 |
| 8 | 100 | 0.1 | — | 12.0 | 60.5 | 73.0 | 92.3 |
| 9 | 100 | 0.1 | — | 14.0 | 66.0 | 79.0 | 91.4 |

EXAMPLE 7

In 100 parts by weight of water were dissolved 0.2 part by weight of Accofloc C485 and 0.1 part by weight of a quaternary ammonium salt of an ethylene oxide adduct of tallow amine as the cationic surface active agent, and polypropylene fiber "P-Chop" (length: 5 mm, thickness: 3 denier) was incorporated and dispersed in an amount shown in Table 7 in the solution to form an aqueous solution of a fiber-incorporated coagulant. Then, 7 g of the so formed coagulant solution was added to 100 g of a raw sewage sludge (solid content=2.8% by weight, ignition loss of solids=65% by weight), and the mixture was stirred for about 1 minute. The filtration test (gravity filtration and compressive filtration) was carried out and the amount of separated water and the water content of the filter cake after the compressive filtration were measured to obtain results shown shown in Table 7.

EXAMPLE 9

In 100 parts by weight of water was dissolved 0.2 part by weight of Accofloc C451, and 1 part by weight of a polyester fiber (20 denier size, 5 mm length) was incorporated and dispersed in the solution to form an aqueous solution of a fiber-incorporated polymeric coagulant. Then, 7 g of the so-formed coagulant solution was added to 100 g of the same mixed raw sewage sludge as used in Example 2, and the mixture was stirred for about 1 minute to form a floc. The solid-liquid separation filtration test (gravity filtration and compressive filtration) was carried out and the amount of separated water and the water content of the filter cake after the compressive filtration was measured. Very good results were obtained.

EXAMPLE 10

The same cationic surface active agent (not added in some runs) as used in Example 7 and polypropylene fiber "P-Chop" (2 denier size, 5 mm length) were added in amounts shown in Table 8 to the same mixed raw sewage sludge as used in Example 1, and the mixture was stirred for about 1 minute. Then, a 0.2% by weight aqueous solution of Accofloc C485 was added in an amount shown in Table 8 to the mixture. When the mixture was stirred for about 30 seconds, a floc was immediately formed. The mixture was then subjected to the dewatering filtration test using a belt press type dewatering filter to obtain results shown in Table 8.

For comparison, the dewatering filtration test was carried out in the same manner as described above except that the fiber was not added. The obtained results are shown in Table 8.

TABLE 7

| | Present Invention | | | | | | | |
|---|---|---|---|---|---|---|---|---|
| | Composition of Coagulant Solution | | | | Amount (g) of Coagulant Solution Added to 100 g to Sludge | Amount (ml) of Separated Water at Gravity Filtration | Amount (ml) of Separated Water at Compressive Filtration | Water Content (% by weight) of Filter Cake after Compressive Filtration |
| Run No. | Water (parts by weight) | Accofloc C485 (parts by weight) | Surface Active Agent (parts by weight) | P-Chop | | | | |
| | | | | Fiber Length (mm) | Amount Added (parts by weight) | | | | |
| 1 | 100 | 0.2 | 0.1 | 2.5 | 1.0 | 7.0 | 67.0 | 86.5 | 84.9 |
| 2 | 100 | 0.2 | 0.1 | 2.5 | 3.0 | 7.0 | 69.0 | 87.5 | 83.5 |
| 3 | 100 | 0.2 | 0.1 | 5.0 | 1.0 | 7.0 | 67.5 | 87.0 | 84.5 |
| 4 | 100 | 0.2 | 0.1 | 5.0 | 3.0 | 7.0 | 69.0 | 89.0 | 82.0 |

EXAMPLE 8

To 100 g of the same mixed raw sewage sludge as used in Example 1 was added 0.1 g or 0.3 g of Vinylon Fiber A (6 denier size, 5 mm length) or Vinylon fiber B (20 denier size, 10 mm length), and 7 g of a 0.2% aqueous solution of Accofloc C485 was further added to the mixture. The mixture was stirred for about 1 minute to form a floc. The solid-liquid separation filtration test (gravity filtration and compressive filtration) was carried out and the amount of separated water and the water content of the filter cake after the compressive filtration were measured. The obtained results were as good as the results obtained in Example 2.

TABLE 8

| Run No. | Amount (parts by weight) of Sludge | Amount (parts by weight) of Surface Active Agent | Amount (parts by weight) of P-Chop | Amount (parts by weight) of 0.2% Solution of Accofloc C485 | Leakage from Filter Cloth* | Discharge State of Filter Cake** | Water Content (% by weight) of Filter Cake*** |
|---|---|---|---|---|---|---|---|
| | | | | Present Invention | | | |
| 1 | 100 | 0 | 0.10 | 7 | good | good | 69 |
| 2 | 100 | 0.05 | 0.05 | 7 | good | good | 70 |
| 3 | 100 | 0.05 | 0.10 | 7 | good | good | 68 |
| 4 | 100 | 0.05 | 0.20 | 7 | good | good | 67 |
| | | | | Comparison | | | |

TABLE 8-continued

| Run No. | Amount (parts by weight) of Sludge | Amount (parts by weight) of Surface Active Agent | Amount (parts by weight) of P-Chop | Amount (parts by weight) of 0.2% Solution of Accofloc C485 | Leakage from Filter Cloth* | Discharge State of Filter Cake** | Water Content (% by weight) of Filter Cake*** |
|---|---|---|---|---|---|---|---|
| 5 | 100 | 0 | 0 | 7 | bad | bad | 75 |

Note
*Leakage from Filter Cloth:
Leakage of sludge flocs from the side face in the pressing zone and leakage of sludge flocks from the mesh texture of the filter cloth were examined and evaluated as follows:
good: no leakage
fair: slight leakage
bad: leakage observed on the entire surface
**Discharge State of Filter Cake:
The discharge state of the filter cake from the filter cloth was examined and evaluated as follows:
good: filter cake discharged smoothly without adherence to the filter cloth or clogging of the filter cloth
fair: filter cake discharged with slight adherence to the filter cloth
bad: filter cake not discharged smoothly, prominent adhesion to the filter cloth, certain clogging of the filter cloth
***Water Content of Filter Cake:
The water content of the filter cake was measured according to the method of JIS A-1203.

EXAMPLE 11

A coagulant solution was prepared by dissolving and dispersing Accofloc C485, the same cationic surface active agent as used in Example 7 and polypropylene fiber "P-Chop" (2 denier size, 5 mm length) in amounts shown in Table 9 into water. The coagulant solution was added in an amount shown in Table 9 to the same raw sewage sludge as used in Example 7, and the mixture was stirred for about 1 minute to form a floc. The dewatering filtration test was carried out by using a belt press type dewatering filter to obtain results shown in Table 9.

For comparison, the dewatering filtration test was carried out in the same manner as described above except that the fiber was not incorporated in the coagulant solution. The obtained results are shown in Table 9.

TABLE 9

| | Compositon of Coagulant Solution | | | Amount (parts by weight) of Coagulant Solution Added to 100 parts by weight of Sludge | Leakage from Filter Cloth | Discharge State of Filter Cake | Water Content (% by weight) of Filter Cake |
|---|---|---|---|---|---|---|---|
| Run No. | Water (parts by weight) | Accofloc C485 (parts by weight) | Surface Active Agent (parts by weight) | P-Chop (parts by weight) | | | |
| | | | Present Invention | | | | |
| 1 | 100 | 0.2 | 0.05 | 0.5 | 7 | good | good | 70 |
| 2 | 100 | 0.2 | 0.05 | 1.0 | 7 | good | good | 68 |
| 3 | 100 | 0.2 | 0.05 | 2.0 | 7 | good | good | 67 |
| | | | Comparison | | | | |
| 4 | 100 | 0.2 | 0 | 0 | 7 | bad | bad | 75 |

It will be obvious to those skilled in the art that various changes may be made without departing from the scope of the invention and the invention is not to be considered limited to what is described in the specification.

What is claimed is:

1. A method for the treatment of sludge comprising introducing to the sludge, and mixing, an organic fiber having a thickness of less than 20 denier and a length of less than 10 mm, and an effective amount of a polymeric coagulant, wherein the amount of the fiber is adjusted to be 0.05 to 20% by weight based on the solids of the sludge, to coagulate the solids in the sludge, and removing water from the coagulated sludge.

2. The method according to claim 1, wherein the fiber comprises one or more members selected from the group consisting of rayon fiber, acetate cellulose fiber, polyester fiber, vinylon fiber, polyamide fiber, aromatic polyamide fiber, acrylic fiber, polypropylene fiber, polyvinyl chloride fiber and polyvinylidene fiber.

3. The method according to claim 1, wherein the coagulant is a cationic polymeric coagulant and is used in the amount of 0.001 to 3% by weight based on the solids of the sludge.

4. The method according to claim 3, wherein said cationic polymeric coagulant is used together with a cationic surface active agent.

5. The method according to claim 1, wherein the amount of fiber introduced is about 0.1 to about 10% by weight, based on the solids of the sludge.

6. The method according to claim 5, wherein the thickness of the fibers is less than 10 denier and the length is about 1 to about 10 mm.

7. The method according to claim 1, wherein the thickness of the fibers is less than 10 denier and the length is about 1 to about 10 mm.

* * * * *